United States Patent [19]

Iriko et al.

[11] Patent Number: 5,260,846
[45] Date of Patent: Nov. 9, 1993

[54] COMPACT HARD DISK ASSEMBLY HAVING A HEAD CARRIAGE POSITIONING ARTS LOCATED WITHIN THE OUTER CIRCUMFERENCE OF A HARD DISK

[75] Inventors: Minoru Iriko, Saitama; Kiyoji Kikuchi, Tokyo, both of Japan

[73] Assignee: Kabushiki Kaisha Toshiba, Kanagawa, Japan

[21] Appl. No.: 740,928

[22] Filed: Aug. 6, 1991

[30] Foreign Application Priority Data

Aug. 8, 1990 [JP] Japan .............................. 2-83255[U]

[51] Int. Cl.⁵ .......................................... G11B 33/12
[52] U.S. Cl. .................... 360/106; 360/77.02; 360/104
[58] Field of Search ............... 360/99.06, 99.02, 77.02, 360/106, 109; 369/44.14, 44.17

[56] References Cited

U.S. PATENT DOCUMENTS 5,034,837 7/1991 Schmitz ............................. 360/105

*Primary Examiner*—Paul M. Dzierzynski
*Assistant Examiner*—Kim-Kwok Chu
*Attorney, Agent, or Firm*—Finnegan, Henderson, Farabow, Garrett & Dunner

[57] ABSTRACT

A hard disk drive for recording/reproducing data to and from a magnetic disk. The hard disk drive includes a base, a magnetic disk disposed on the base, a magnetic head which records/reproduces data to and from the magnetic disk, and a carriage assembly freely rotatably mounted on a rotation axis. The magnetic head is connected to a carriage with a suspension therebetween, and is positioned to predetermined positions on the magnetic disk. A rotation axis of the carriage is placed inside an outer circumference of the magnetic disk to achieve further compactness of the hard disk drive.

3 Claims, 4 Drawing Sheets

COMPACT HARD DISK ASSEMBLY HAVING A HEAD CARRIAGE POSITIONING ARTS LOCATED WITHIN THE OUTER CIRCUMFERENCE OF A HARD DISK

BACKGROUND OF THE INVENTION

1. Field of the Invention

The present invention relates to a hard disk drive which is capable of recording and reproducing data and is so designed that the hard disk drive becomes particularly compact, space-efficient and light-weight.

2. Description of the Prior Art

A hard disk drive belongs to one of computer-peripheral equipment capable of recording and reproducing data. The hard disk drive is provided with the mechanism in that a magnetic head, operating as a transducer, records and reproduces data, and a rotary actuator moves the magnetic head to designated positions then holds it at such positions.

Based on FIG. 1, the rotary actuator in a conventional hard disk drive is briefly explained as follows.

The hard disk drive contains a base 1 which constitutes a part of a lower housing portion, and on the base 1, a magnetic disk 3 is freely rotatably provided through a spindle motor 5. A pivot 7 disposed in parallel with a rotation axis of the magnetic disk 3 is constructed outside an outer circumference 4 on the base 1. A carriage 9 is freely rotatably coupled to the pivot 7. At one end of the carriage 9 in the direction toward the magnetic disk 3, the magnetic head 13 is provided and is coupled to a suspension 12; a coil 15 is provided at another end of the carriage 9. The magnetic head 13 and the suspension 12 together form a head assembly.

Yokes as a part of a magnetic circuit are provided on the base 1 with the coil 15 located therebetween. A permanent magnet is mounted on one of the yokes to constitute a voice coil motor (VCM). As a result of interaction between the magnetic field generated from the coil 15 and the one from the permanent magnet with a certain level of control currents supplied to the coil 15, a thrust is produced to drive the carriage 9. Thus, in the conventional hard disk drive, the thrust generated in the coil 15 rotates the carriage 9 connected to the coil 15 about the pivot 7 situated outside the outer circumference 4 of the magnetic disk 3, so that the magnetic head 13 mounted in one end of carriage 9 can be positioned to predetermined positions to record/reproduce data to and from the magnetic disk 3.

Recently, in the computer-peripheral equipment, there is a tendency toward making such computer-peripheral equipment utmost compact, space efficient and thereby light weight. This also concerns the hard disk drive. However, as shown in FIG. 1, since the carriage 9 positioning the magnetic head 13 on the magnetic disk 3 is supported by the pivot 7 situated outside the outer circumference 4 of the magnetic disk 3 in conventional hard disk drives, a length L of the hard disk drive is determined by a radius r of magnetic disk 3, a size of pivot p and a size of coil c for a certain size of magnetic disk. Thus, in order to achieve further compactness it is suggested to reduce the size of pivot p and the size of coil c while those current sizes are possibly minimum to almost utmost limit.

SUMMARY OF THE INVENTION

Accordingly, an object of the present invention is to provide a smaller, more space-efficient, further compact hard disk drive that solves the foregoing problem.

In carrying out the present invention in one preferred mode, we utilize a hard disk drive comprising a base, a magnetic disk which is provided on the base and rotates about a rotation axis of the magnetic disk, a head assembly having a magnetic head for recording/reproducing data to and from a magnetic disk, and a carriage assembly for positioning the magnetic head at predetermined positions in the magnetic disk by rotating about a rotation axis of the carriage assembly. The rotation axis of the carriage assembly is placed inside an outer circumference of the magnetic disk.

Since the rotation axis of the carriage is positioned inside the outer circumference of the magnetic disk according to the present invention, the space occupied by the rotation axis of carriage is included in the space for the magnetic disk to be positioned. Therefore, there is no longer necessity for additional space outside the outer circumference of the magnetic disk and exclusively for the rotation axis for carriage.

These and other objects, features and advantages of the present invention will be more apparent from the following description of preferred embodiments, taken in conjunction with the accompanying drawings.

DETAILED DESCRIPTION OF THE PREFERRED EMBODIMENTS

Figure 1:
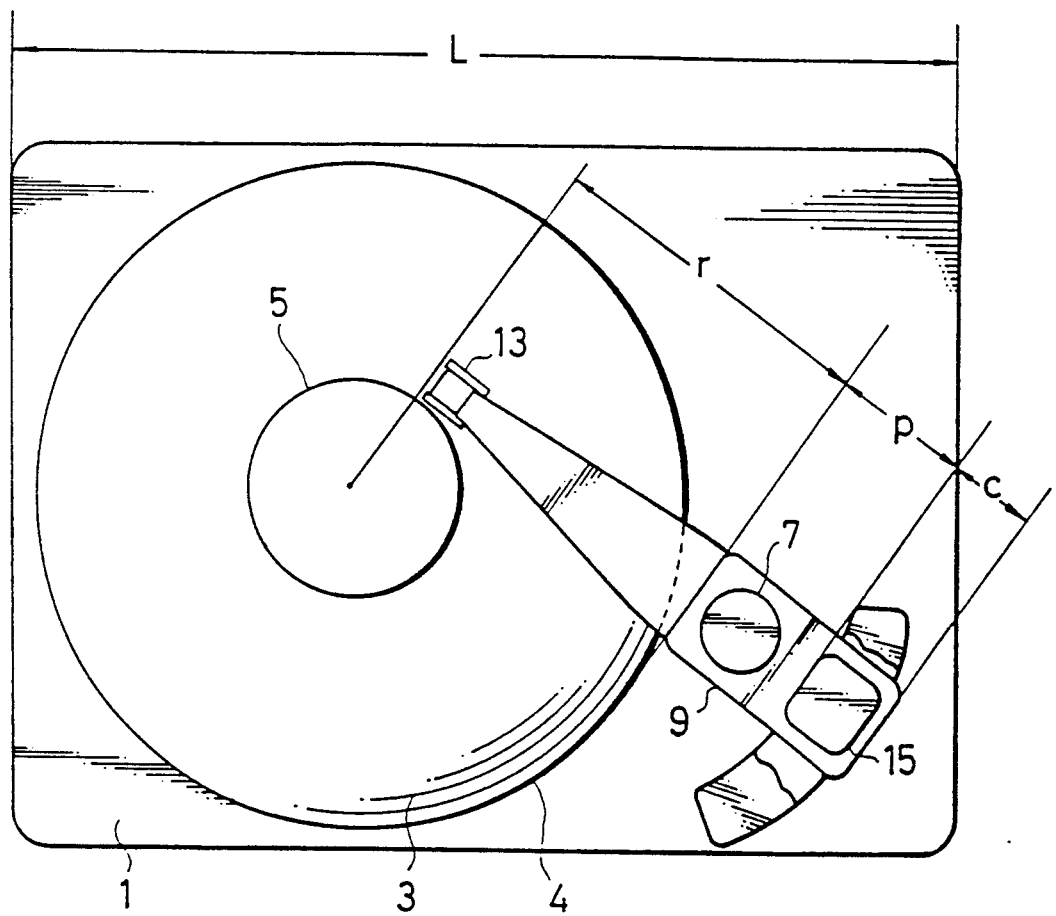
FIG. 1 is a typical configuration, viewed from the top, of a conventional hard disk drive.
Figure 2:
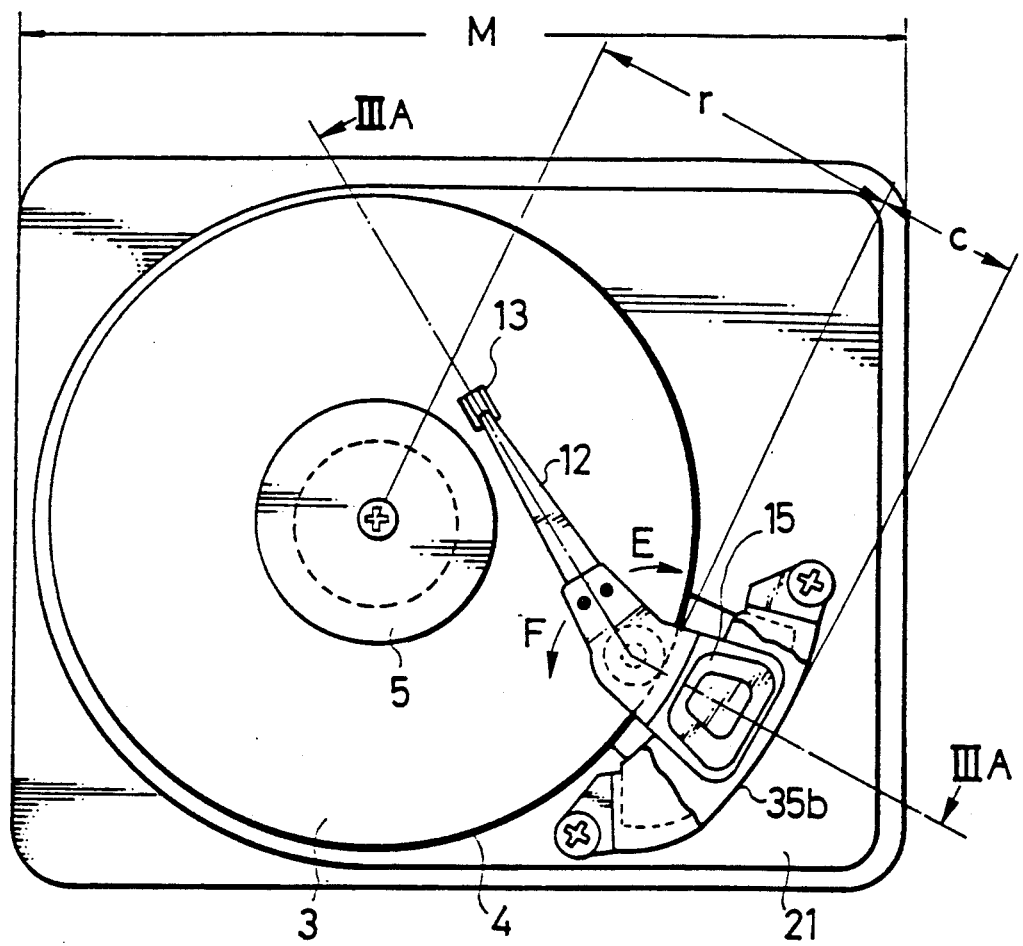
FIG. 2 is a top view of an embodiment of a hard disk drive according to the present invention.
Figure 3A:
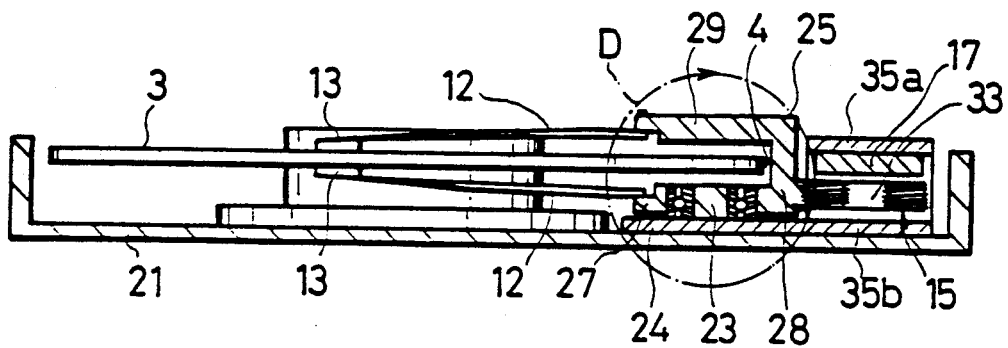
FIG. 3A is a sectional view of the hard disk drive taken substantially along line IIIA—IIIA in FIG. 2.
Figure 3B:
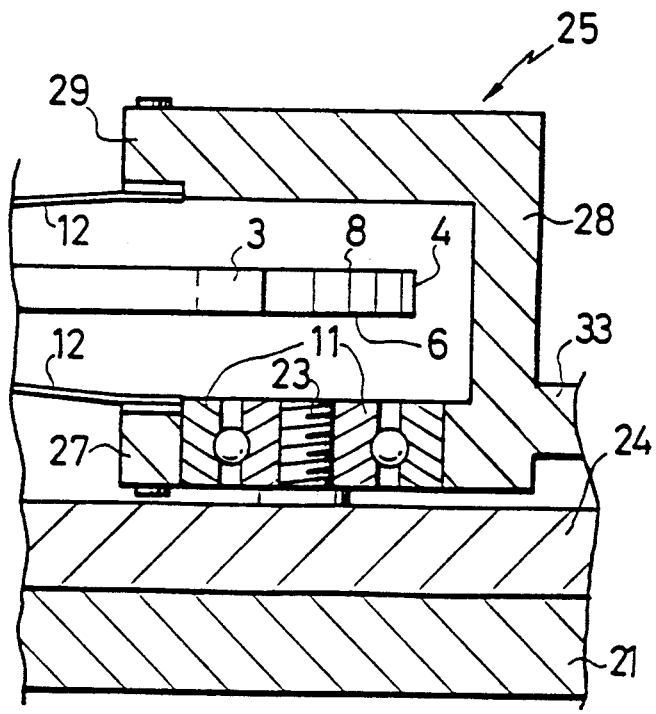
FIG. 3B is an enlarged sectional view of a bearing portion shown in circular arrow C in FIG. 3A.

Referring to FIG. 2, FIG. 3A and FIG. 3B, an embodiment of a hard disk drive according to the present invention is explained as follows.

The hard disk drive has a base 21 which constitutes the lower side of hard disk drive housing. A pivot 23 as a rotation axis of a carriage 25 is located underneath a magnetic disk 3. The pivot 23 is mounted on a pedestal 24 placed on the base 21. The pivot 23 is situated inside an outer circumference 4 of the magnetic disk 3 and in parallel with a rotation axis of magnetic disk 3 (see FIG. 3B).

FIG. 3A and FIG. 3B show that the pivot 23 is freely rotatably supported by a bearing 11. Namely, the carriage 25 is composed of: a first arm portion 27 which is situated between a reverse side 6 of the magnetic disk 3 and the base 21 and occupies a space in the outward vicinity of the outer circumference 4; a vertical portion 28 which is connected from the first arm 27 and extended upward over a surface 8 of magnetic disk 3; a second arm portion 29 which is extended from the upper end of the vertical portion 28 and in parallel with the magnetic disk 3; and a protruding portion 33 which is extended from a lower part of the vertical portion 28 in the opposite direction with respect to the first arm portion 27. In other words, both the second arm portion 29 and first arm portion 27 are connected to each other in the outward vicinity of the outer circumference 4 through the vertical portion 28. The first arm portion 27 of the carriage 25 is freely rotatably supported by the the pivot 23 with the bearing 11 therebetween.

A pair of magnetic heads 13, 13, each of which is located under and above the the magnetic disk 3, are secured with screws to suspensions 12, 12 extending from the first arm portion 27 and the second arm portion 29 of the carriage 25. The suspension 12 has a mount member at the opposite end to the magnetic head side. The mount member of the suspension 12 is mounted to the carriage 25. A coil 15 is mounted in a protruding portion 33.

Yokes 35a and 35b are provided on the base 21, forming a magnetic circuitry with the coil 15 therebetween. A permanent magnet 17 is attached to the upper yoke 35a, constituting a voice coil motor (VCM). The lower yoke 35b is extended to the underneath region of the magnetic disk 3 and the extended portion serves as pedestal 24 of the pivot 23.

The magnetic disk 3 is attached to a spindle motor 5. The magnetic disk 3 is mounted on a hub(not shown) which is mounted to the rotation axis of spindle motor 5. A retainer (not shown) secures the magnetic disk 3 with a screw.

The magnetic head 13 and the suspension 12 form a head assembly. A carriage assembly comprises the head assembly, the carriage 25 and the VCM. The carriage assembly is also referred to as a rotary actuator.

When the predetermined control current flows through the coil 15, a thrust is produced at the coil 15 of a magnetic circuit having a permanent magnet 17. The thrust rotates in either direction of E or F (see FIG. 2) the carriage 25 about the pivot 23 that is located inside the outer circumference 4 of the magnetic disk 3. Consequently, the magnetic heads 13, 13, each located at the end of the first arm portion 27 and second arm portion 29, are positioned to predetermined positions.

Since the pivot 23 situated under the magnetic disk 3 is placed inside the outer circumference 4 of the magnetic disk 3 in the hard disk drive designed in the aforementioned manner, so that a space occupied by the pivot 23 is included in the area previously provided exclusively for the magnetic disk 3, there is no longer necessity to secure a space exclusively for the pivot 23 in the area outside the outer circumference 4. Therefore, only the length M, the radius r and the size c as in FIG. 2 are required, thus enabling the hard disk drive to be more compact.

Figure 4:
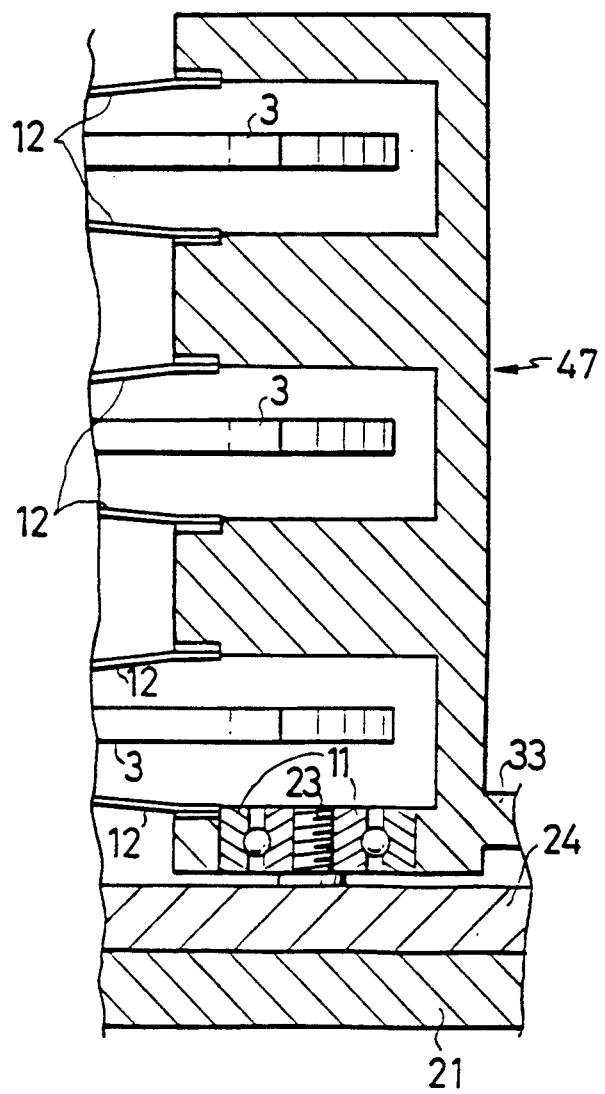
FIG. 4 is an enlarged sectional view of a bearing portion of a modified version of hard disk drive according to the present invention.

It will be recognized that there are other various modifications possible to the above embodiment. For example, a hard disk drive may comprise a plurality of magnetic disks, for instance, three magnetic disks as shown in FIG. 4 while the rest of the configuration and function is similar to the above embodiment.

In summary, according to the present invention, the rotation axis of the carriage 23 having the magnetic head 13 in the end is placed inside the outer circumference 4 but in a different position from the rotation axis of magnet disk 3. Therefore, the rotation axis of the carriage 23 is now included in the region exclusively needed for placing the magnetic disk 3 alone in a conventional hard disk drive. This configuration according to the present invention thus achieves further compactness over a conventional hard disk drive.

Other various modifications will become possible for those skilled in the art after receiving the teachings of the present disclosure.

It is intended that the specification and examples be considered as exemplary only, with a true scope and spirit of the invention being indicated by the following claims.

What is claimed is:

1. A hard disk drive, comprising:
    at least one magnetic disk rotatable about a first rotation axis;
    at least one magnetic head for reading and writing information to and from the at least one magnetic disk; and
    positioning means rotatable about a second rotation axis for positioning the at least one magnetic head at predetermined positions in relation to the at least one magnetic disk,
    the second rotation axis being positioned between the first rotation axis and an outer circumference of the at least one magnetic disk.

2. The hard disk drive of claim 1, further comprising a base, wherein the positioning means includes a carriage having a first arm portion extending along a first surface of the at least one magnetic disk and between the first surface and the base, a second arm portion extending along a second surface of the at least one magnetic disk, and a vertical portion joining a first end of the first arm portion to a first end of the second arm portion outside the outer circumference of the at least one magnetic disk, at least one magnetic head being mounted on a second end of the first arm portion and at least one magnetic head being mounted on a second end of the second arm portion.

3. The hard disk drive of claim 2, wherein the first arm portion of the carriage is freely rotatable about the second rotation axis.

* * * * *

UNITED STATES PATENT AND TRADEMARK OFFICE
CERTIFICATE OF CORRECTION

PATENT NO. : 5,260,846
DATED : November 09, 1993
INVENTOR(S) : Minoru Iriko et al.

It is certified that error appears in the above-indentified patent and that said Letters Patent is hereby corrected as shown below:

On the title page: Item 54 and Column 1, line 3,
change "ARTS" to --AXIS--.

Signed and Sealed this

Sixth Day of September, 1994

Attest:

BRUCE LEHMAN

*Attesting Officer*   *Commissioner of Patents and Trademarks*